US012709284B2

(12) United States Patent
Kato et al.

(10) Patent No.: US 12,709,284 B2
(45) Date of Patent: Aug. 18, 2026

(54) CONTROL SYSTEM, MANAGEMENT METHOD, AND MANAGEMENT PROGRAM

(71) Applicant: Hitachi Astemo, Ltd., Hitachinaka (JP)

(72) Inventors: Seiya Kato, Tokyo (JP); Takahiro Ikeda, Tokyo (JP); Takashi Matsumoto, Tokyo (JP); Yoshitaka Atarashi, Tokyo (JP); Yasuhiro Fuse, Tokyo (JP); Akihiro Kondo, Tokyo (JP)

(73) Assignee: Hitachi Astemo, Ltd., Ibaraki (JP)

( * ) Notice: Subject to any disclaimer, the term of this patent is extended or adjusted under 35 U.S.C. 154(b) by 29 days.

(21) Appl. No.: 19/099,798

(22) PCT Filed: Jul. 3, 2023

(86) PCT No.: PCT/JP2023/024658

§ 371 (c)(1),
(2) Date: Jan. 30, 2025

(87) PCT Pub. No.: WO2024/070110

PCT Pub. Date: Apr. 4, 2024

(65) Prior Publication Data

US 2026/0034998 A1 Feb. 5, 2026

(30) Foreign Application Priority Data

Sep. 26, 2022 (JP) ................................ 2022-152370

(51) Int. Cl.

*B60W 50/02* (2012.01)
*B60W 50/14* (2020.01)
*B60W 60/00* (2020.01)

(52) U.S. Cl.

CPC ........ *B60W 50/0205* (2013.01); *B60W 50/14* (2013.01); *B60W 60/0015* (2020.02);

(Continued)

(58) Field of Classification Search

None

See application file for complete search history.

(56) References Cited

U.S. PATENT DOCUMENTS 5,910,931 A * 6/1999 Pettyjohn .............. G04G 13/02 368/251
6,650,977 B2 * 11/2003 Miller ................ B60R 16/0234 701/32.7

(Continued)

FOREIGN PATENT DOCUMENTS

JP 2004-092347 A 3/2004
JP 2017-102519 A 6/2017

(Continued)

*Primary Examiner* — Daniel L Greene

(74) *Attorney, Agent, or Firm* — Volpe Koenig

(57) ABSTRACT

A control system, a management method, and a management program for autonomous driving capable of reliably performing a safety check on a surrounding of an autonomous driving vehicle and reducing a risk of collision during a startup due to a check omission. Whether a safety check is performed is grasped using an in-vehicle camera that monitors a surrounding of a vehicle, a QR code (registered trademark) set at the surrounding of the vehicle, or a one-time password, and an erroneous vehicle is not subjected to a startup by using a check result in response to an instruction to start an autonomous driving by an on-site manager. Further, a range in which the autonomous driving or the remote control operation is permitted is set according to a range in which the check is performed. Accordingly, a risk of collision during a startup of the autonomous driving vehicle is reduced.

9 Claims, 15 Drawing Sheets

| 521 VEHICLE IDENTIFIER | 522 LATITUDE | 523 LONGITUDE | 524 SPEED [km/h] | 525 TRAVELING DIRECTION | 526 STATE | 527 PLACE | 528 SAFETY CHECK STATE | 529 STATE UPDATE TIME | 530 SAFETY CHECK TIME | 531 INSPECTION STATE | 532 INSPECTION DATE AND TIME |
|---|---|---|---|---|---|---|---|---|---|---|---|
| 1 | XXX | XXX | 0 | 0 | PARKING | 3 (UNLOADING PLACE C) | COMPLETED (FRONT • REAR) | 10:01:00 | 10:00:00 | COMPLETED | 2022/08/01/ 08:30:00 |
| 2 | XXX | XXX | 0 | 0 | PARKING | 4 (UNLOADING PLACE D) | NOT PERFORMED | 10:01:10 | — | NOT PERFORMED | — |
| 3 | XXX | XXX | 15 | 15 | TRAVELING | — | — | 09:30:00 | — | COMPLETED | 2022/08/01/ 09:00:00 |
| 4 | XXX | XXX | 0 | 0 | PARKING | 2 (LOADING PLACE B) | COMPLETED (FRONT • RIGHT • LEFT • REAR) | 10:00:10 | 09:30:00 | COMPLETED | 2022/08/01/ 08:50:00 |
|  |  |  |  |  |  |  |  |  |  |  |  |
|  |  |  |  |  |  |  |  |  |  |  |  |
|  |  |  |  |  |  |  |  |  |  |  |  |

(52) U.S. Cl.
CPC ... *B60W 2050/146* (2013.01); *B60W 2556/45* (2020.02); *B60W 2756/10* (2020.02)

(56) References Cited

U.S. PATENT DOCUMENTS

| | | | | |
|---|---|---|---|---|
| 2008/0163231 | A1* | 7/2008 | Breen | G06Q 10/06 718/104 |
| 2018/0354517 | A1 | 12/2018 | Banno et al. | |
| 2019/0137999 | A1 | 5/2019 | Taguchi et al. | |
| 2020/0167723 | A1* | 5/2020 | Cocuzza | G01S 19/51 |
| 2020/0410788 | A1* | 12/2020 | Uchiyama | G01M 17/007 |
| 2021/0183186 | A1* | 6/2021 | Patnaik | G01G 19/02 |
| 2022/0032874 | A1 | 2/2022 | Hayakawa | |
| 2023/0401954 | A1* | 12/2023 | Tamura | G08G 1/0129 |

FOREIGN PATENT DOCUMENTS

| | | | |
|---|---|---|---|
| JP | 2019-209737 | A | 12/2019 |
| JP | 2022-008586 | A | 1/2022 |
| WO | 2020/121009 | A1 | 6/2020 |

* cited by examiner

FIG. 1

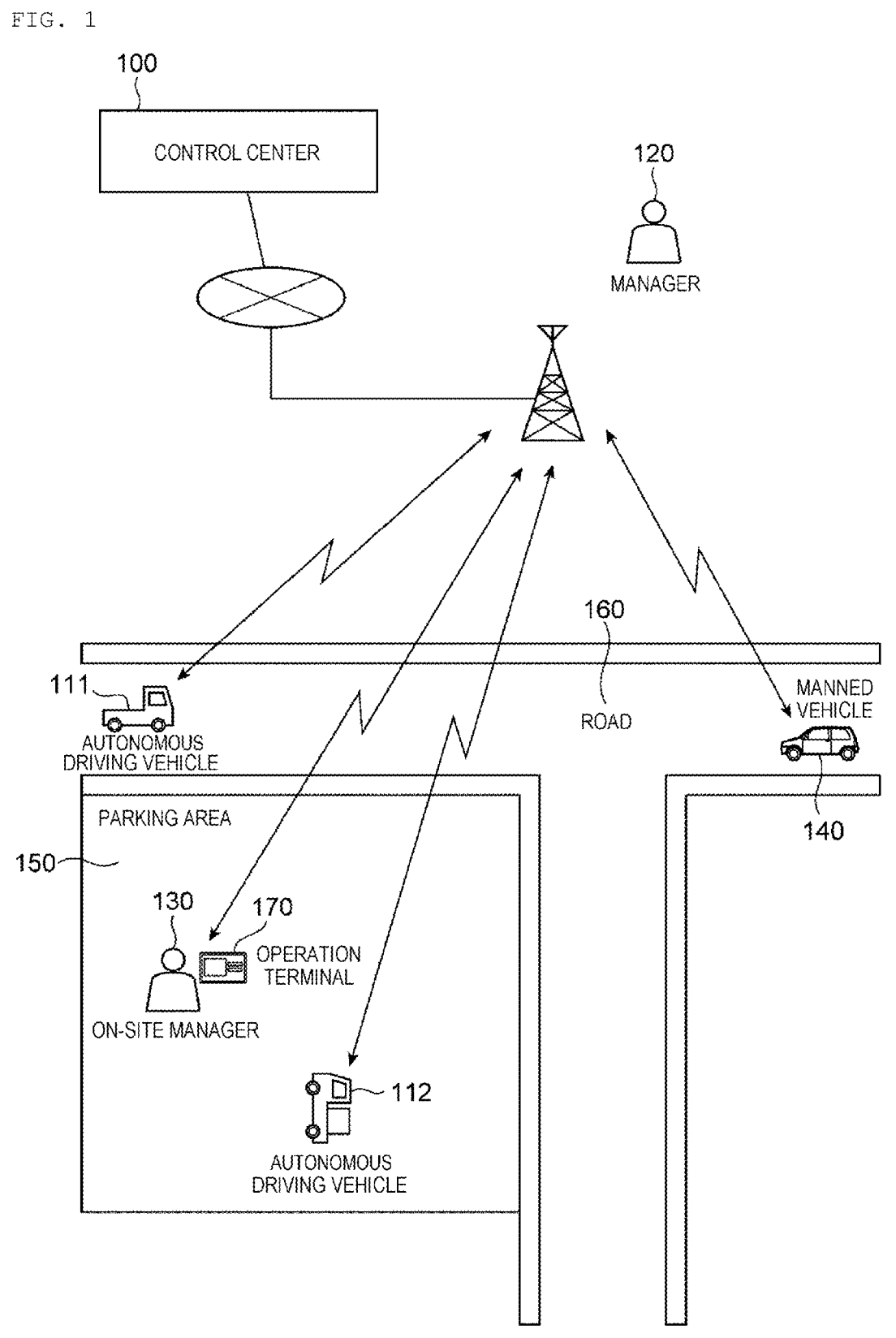

100
CONTROL CENTER
120
MANAGER
160
ROAD
111
AUTONOMOUS DRIVING VEHICLE
MANNED VEHICLE
140
PARKING AREA
150
130
170
OPERATION TERMINAL
ON-SITE MANAGER
112
AUTONOMOUS DRIVING VEHICLE

| AREA IDENTIFIER (501) | AREA NAME (502) | AUTONOMOUS DRIVING START POSSIBILITY (503) | COORDINATES (504) |
|---|---|---|---|
| 1 | LOADING PLACE A | POSSIBLE | $a_1(x_1,y_1),a_2(x_2,y_2),\cdots$ |
| 2 | LOADING PLACE B | POSSIBLE | ( ),( ),( ),( ) |
| 3 | UNLOADING PLACE C | IMPOSSIBLE | ( ),( ),( ),( ) |
| 4 | UNLOADING PLACE D | IMPOSSIBLE | ( ),( ),( ),( ) |
| 5 | PARKING SPACE | POSSIBLE | ( ),( ),( ),( ) |

FIG. 5B

| 521 | 522 | 523 | 524 | 525 | 526 | 527 | 528 | 529 | 530 | 531 | 532 |
|---|---|---|---|---|---|---|---|---|---|---|---|
| VEHICLE IDENTIFIER | LATITUDE | LONGITUDE | SPEED [km/h] | TRAVELING DIRECTION | STATE | PLACE | SAFETY CHECK STATE | STATE UPDATE TIME | SAFETY CHECK TIME | INSPECTION STATE | INSPECTION DATE AND TIME |
| 1 | XXX | XXX | 0 | 0 | PARKING | 3 (UNLOADING PLACE C) | COMPLETED (FRONT • REAR) | 10:01:00 | 10:00:00 | COMPLETED | 2022/08/01/ 08:30:00 |
| 2 | XXX | XXX | 0 | 0 | PARKING | 4 (UNLOADING PLACE D) | NOT PERFORMED | 10:01:10 | — | NOT PERFORMED | — |
| 3 | XXX | XXX | 15 | 15 | TRAVELING | — | — | 09:30:00 | — | COMPLETED | 2022/08/01/ 09:00:00 |
| 4 | XXX | XXX | 0 | 0 | PARKING | 2 (LOADING PLACE B) | COMPLETED (FRONT • RIGHT • LEFT • REAR) | 10:00:10 | 09:30:00 | COMPLETED | 2022/08/01/ 08:50:00 |
|  |  |  |  |  |  |  |  |  |  |  |  |
|  |  |  |  |  |  |  |  |  |  |  |  |
|  |  |  |  |  |  |  |  |  |  |  |  |

FIG. 5C

| AREA IDENTIFIER (541) | AREA NAME (542) | AREA STATE (543) | STATE UPDATE TIME (544) |
|---|---|---|---|
| 1 | LOADING PLACE A | WORKING | 10:01:00 |
| 2 | LOADING PLACE B | NO WORK | 10:01:10 |
| 3 | UNLOADING PLACE C | NO WORK | 09:30:00 |
| 4 | UNLOADING PLACE D | WORKING | 10:00:10 |
| | | | |
| | | | |
| | | | |

AUTONOMOUS DRIVING VEHICLE
303B
DISPLAY UNIT
314
FRONT ONE-TIME PASSWORD DISPLAY DEVICE
315
REAR ONE-TIME PASSWORD DISPLAY DEVICE
316
RIGHT SIDE ONE-TIME PASSWORD DISPLAY DEVICE
317
LEFT SIDE ONE-TIME PASSWORD DISPLAY DEVICE
303
SAFETY CHECKING DEVICE
302
AUTONOMOUS DRIVING DEVICE
308
GNSS
309
COMMUNICATION DEVICE
310
IN-VEHICLE NETWORK
301
VEHICLE CONTROL SYSTEM

CONTROL SYSTEM, MANAGEMENT METHOD, AND MANAGEMENT PROGRAM

TECHNICAL FIELD

The present invention relates to a control system, a management method, and a management program for autonomous driving related to a control technique of a control center that manages an autonomous driving vehicle.

BACKGROUND ART

There is a system using an autonomous driving vehicle for a purpose of increasing efficiency of material transportation and reducing the number of people in tasks requiring transportation of various materials in a wide site such as a factory or a harbor facility. In the material transportation, loading and unloading work of materials may occur, and a person may work near the autonomous driving vehicle. In order to ensure safety, it is necessary to avoid a collision by appropriately detecting a person in a system. Therefore, a technique of detecting a person using a camera, LIDAR, or the like to avoid a collision is put into practical use. However, the camera or the LIDAR may fail to detect a person depending on a situation. In particular, since a blind spot is generated at a surrounding of the vehicle at a timing when the vehicle starts moving, it is difficult to ensure safety only by the system, and it is important to visually perform a safety check by a person on the site. On the other hand, such safety check can easily become a formality as the work is familiar, and a risk of the collision may be further increased since an appropriate check action is not performed. In addition, when a plurality of autonomous driving vehicles are operated, there is a risk that a target autonomous driving vehicle is erroneously selected when the system is notified of the startup, and the autonomous driving vehicle on which the safety check is not performed moves. In other words, in an autonomous driving system for transporting materials in a limited range such as the factory or the harbor facility, the safety check of the surrounding at the time of a startup or starting remote control can easily become a formality or designation of a target vehicle may be erroneously performed, which may increase a collision risk at the time of a startup of the autonomous driving vehicle. Therefore, it is important how the system checks that the safety check is appropriately performed.

As a technique for the safety check in the related art, there is a method in which a plurality of safety check switches are provided at surrounding predetermined positions as in PTL 1, and the safety check switch is brought into a travelable state when a safety check signal is input. Further, as a method for specifying a vehicle, there is a method using a QR code (registered trademark) as in PTL 2.

CITATION LIST

Patent Literature

PTL 1: JP2004-92347A
PTL 2: WO2020/121009

SUMMARY OF INVENTION

Technical Problem

However, in the related art as disclosed in PTL 1, it is necessary for a person to approach a position at which a physical button is pressed, a mechanism for reducing a risk of a person himself or herself who presses the physical button is required. The use of the QR code (registered trademark) as in PTL 2 does not ensure the safety check of the surrounding when the QR code is used as the safety check.

The invention has been made in view of the above circumstances, and an object of the invention is to provide a control system, a management method, and a management program for autonomous driving capable of reliably perform a safety check on a surrounding of an autonomous driving vehicle and reducing a risk of collision during a startup due to a check omission.

Solution to Problem

In order to solve the above problems, a control system according to the invention is a control system including: an autonomous driving vehicle; a management device configured to manage the autonomous driving vehicle; and an operation terminal configured to remotely operate the autonomous driving vehicle, in which the autonomous driving vehicle includes a safety checking unit configured to check safety of a surrounding of the autonomous driving vehicle, and an autonomous driving unit configured to start autonomous driving in response to a command from the operation terminal, the management device includes an autonomous driving vehicle management unit configured to manage the autonomous driving vehicle, when an operation request of the autonomous driving vehicle is received from the operation terminal, the autonomous driving vehicle management unit transmits a permission signal for permitting the operation request to the operation terminal and the autonomous driving vehicle based on a check result of the safety checking unit, and the autonomous driving vehicle executes the autonomous driving based on the permission signal and an operation instruction from the operation terminal.

A management method according to the invention is a management method for managing an autonomous driving vehicle that starts autonomous driving in response to a command from an operation terminal that remotely operates the autonomous driving vehicle. The management method includes: a safety checking step of checking safety of a surrounding of the autonomous driving vehicle; a transmission step of transmitting, when an operation request of the autonomous driving vehicle is received from the operation terminal, a permission signal for permitting the operation request to the operation terminal and the autonomous driving vehicle based on a check result of the safety checking step; and an autonomous driving execution step of executing the autonomous driving of the autonomous driving vehicle based on the permission signal and an operation instruction from the operation terminal.

A management program according to the invention is a management program for managing an autonomous driving vehicle that starts autonomous driving in response to a command from an operation terminal that remotely operates the autonomous driving vehicle, in which when an operation request of the autonomous driving vehicle is received from the operation terminal, the management program causes a computer to execute a procedure of transmitting a permission signal for permitting the operation request to the operation terminal and the autonomous driving vehicle based on a check result of checking safety of a surrounding of the autonomous driving vehicle.

Advantageous Effects of Invention

According to the invention, the safety check of the surrounding of the autonomous driving vehicle is reliably performed, and it is possible to reduce a risk of collision during startup due to a check omission.

Problems, configurations, and effects other than those described above will be clarified by the following description of embodiments.

BRIEF DESCRIPTION OF DRAWINGS

FIG. 1 is a diagram showing a system configuration according to a first embodiment of the invention.

FIG. 5B is a diagram showing an internal data management table (vehicle state management table) according to the first embodiment of the invention.

FIG. 5C is a diagram showing an internal data management table (on-site state management table) according to the first embodiment of the invention.

DESCRIPTION OF EMBODIMENTS

Figure 2:
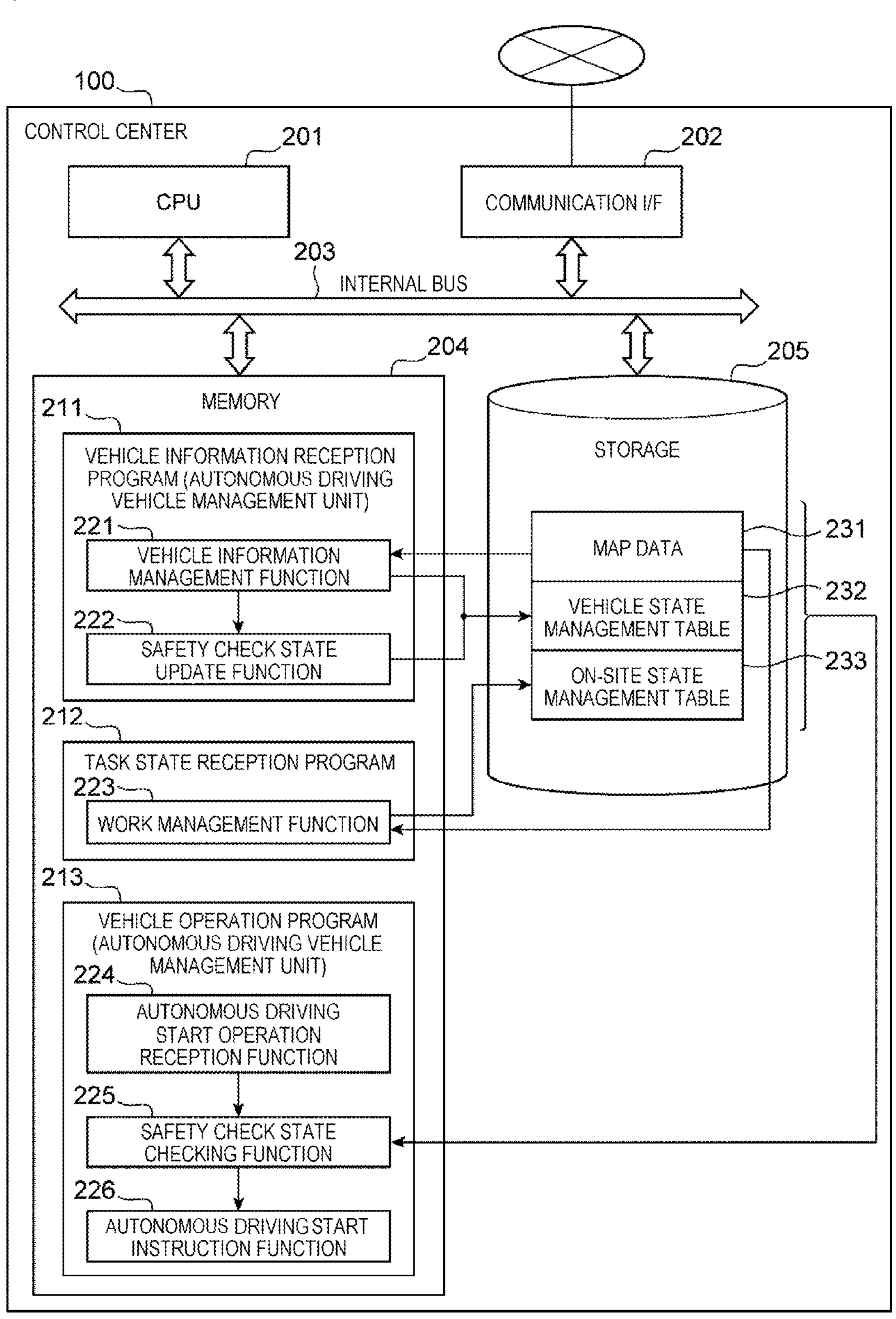
FIG. 2 is a functional configuration diagram of a control center according to the first embodiment of the invention.

Hereinafter, embodiments of the invention will be described in detail with reference to the drawings. In all the drawings illustrating the present embodiment, members having the same function are denoted by the same reference numeral, and the repeated description thereof is omitted.

First Embodiment

Hereinafter, a first embodiment of the invention will be described with reference to FIGS. 1 to 6.

FIG. 1 is a diagram showing a configuration of an autonomous driving system (control system) including a control center 100 according to the present embodiment. The autonomous driving system (control system) according to the present embodiment is assumed to be used in a place (site), such as in-factory distribution and harbor facilities, in which materials are transported, an environment is assumed in which autonomous driving vehicles 111 and 112, a manned vehicle 140, and an on-site manager 130 coexist, and a case is assumed in which a road 160 and a parking area 150 are set as a range in which the autonomous driving vehicles 111 and 112 move.

The control center 100 performs wireless communication with the autonomous driving vehicles 111 and 112, the manned vehicle 140, and the on-site manager 130 in the site, grasps a position and a state, and issues a movement instruction for transportation to the autonomous driving vehicles 111 and 112. In addition, the control center 100 holds an I/F for a manager 120, and notifies the manager 120 of a situation of the autonomous driving vehicles 111 and 112, the manned vehicle 140, and the on-site manager 130 in the site, a transportation situation of materials, a situation of the parking area 150, and the like. In addition, the control center 100 receives a material transport instruction or an emergency stop instruction in an emergency from the manager 120 to the autonomous driving vehicles 111 and 112. It is assumed that the control center 100 physically provides a server in the site or constructs the server in a cloud environment. In order to ensure safety of the entire site, the control center 100 monitors states of the autonomous driving vehicles 111 and 112, and determines departure of the autonomous driving vehicle based on information of start permission of the autonomous driving vehicle by an operation of an operation terminal 170 performed by the on-site manager 130, thereby ensuring the safety of the entire site.

According to the instruction from the control center 100, the autonomous driving vehicles 111 and 112 move on the designated road 160 and parking area 150 in the site and transport materials. The autonomous driving vehicles 111 and 112 each hold a device for acquiring position information such as a GNSS system and a communication device for communicating with the control center 100, and periodically transmit the position information and vehicle speeds of the autonomous driving vehicles 111 and 112 to the control center 100. In addition, at a start of the departure, in response to an inquiry from the control center 100, a situation of a safety check at surroundings of the autonomous driving vehicles 111 and 112 is notified. The autonomous driving vehicles 111 and 112 are permitted to start autonomous driving based on a final determination of the control center 100.

When the on-site manager 130 causes the autonomous driving vehicles 111 and 112 to departure, the on-site manager 130 performs the safety check of the surroundings and permits the departure on the operation terminal 170. The operation terminal 170 is a communication terminal such as a tablet or a smart phone for remotely operating the autonomous driving vehicles 111 and 112, and communicates with the control center 100.

The manned vehicle 140 travels in the site to transport a person or transport a material that the autonomous driving vehicles 111 and 112 cannot handle. Similarly to the autonomous driving vehicles 111 and 112, the manned vehicle 140 also holds the device for acquiring position information such as the GNSS system and the communication device for communicating with the control center 100, and periodically transmit the position information and a vehicle speed of the own vehicle to the control center 100.

Next, a function of the control center 100 that implements the autonomous driving system according to the present embodiment will be described. FIG. 2 shows a hardware structure and a software configuration of the control center 100. The control center 100 includes a CPU 201, a communication I/F 202, a memory 204, a storage 205, and an internal bus 203 for connecting these components. The control center 100 is assumed to be a general PC, a server, or a cloud. In FIG. 2, the storage 205 and the CPU 201 for executing programs are described as the same device. Alternatively, the storage 205 may be implemented using plurality of devices such as a DB server.

On the CPU 201, a vehicle information reception program 211, a task state reception program 212, and a vehicle operation program 213 are executed. The vehicle information reception program 211 and the vehicle operation program 213 together constitute an autonomous driving vehicle management unit for managing the autonomous driving vehicle by the control center 100.

The vehicle information reception program 211, the task state reception program 212, and the vehicle operation program 213 are loaded on the memory 204.

The storage 205 holds map data (hereinafter, may be referred to as a map data table) 231, a vehicle state management table 232, and an on-site state management table 233.

The vehicle information reception program 211 has a vehicle information management function 221 and a safety check state update function 222, and updates the states related to the autonomous driving vehicles in the vehicle state management table 232 when information is received from the autonomous driving vehicles 111 and 112. At this time, the current position on a map is checked using the map data 231. When the autonomous driving vehicles 111 and 112 are parked, safety state check results (safety check state) related to the autonomous driving vehicles in the vehicle state management table 232 are updated in relation to safety state check situations transmitted from the autonomous driving vehicles 111 and 112.

The task state reception program 212 has a work management function 223, and when information is received from the on-site manager 130, checks which parking area 150 the on-site manager 130 is in using the map data 231 and updates a work state related to the corresponding parking area 150 in the on-site state management table 233. In the present embodiment, it is assumed that the work state is directly received from the on-site manager 130. Alternatively, a camera or the like may be provided in the parking area 150, the work state may be notified based on information of the on-site manager detected by the camera, and the on-site state management table 233 may be updated by the work management function 223.

The vehicle operation program 213 has an autonomous driving start operation reception function 224, a safety check state checking function 225, and an autonomous driving start instruction function 226. When a startup command (operation request) of the autonomous driving vehicle is received from the on-site manager 130 using the operation terminal 170, the vehicle operation program 213 searches the vehicle state management table 232 for the autonomous driving vehicle as a startup target, checks the safety check state of the vehicle state management table 232, checks whether the corresponding area may be a place appropriate for the startup based on the map data 231, checks whether the corresponding area is in working to prohibit the startup of the autonomous driving vehicle based on the on-site state management table 233, and determines whether the autonomous driving can be started. The vehicle operation program 213 transmits this determination result to the autonomous driving vehicle as a target and the operation terminal 170 to which the startup command (operation request) of the autonomous driving vehicle is transmitted.

The map data 231 is data registered in the control center 100 in advance, map information in the site is set, and information, such as coordinates of each parking area 150 and whether the parking area 150 is a place in which the autonomous driving may be started, is set.

The vehicle state management table 232 is updated by the vehicle information reception program 211, and the position, the state, and the safety check state of the autonomous driving vehicle notified from the autonomous driving vehicle are set.

The on-site state management table 233 is updated by the task state reception program 212, and presence or absence of work in the parking area 150 notified from the on-site manager 130 is set.

Figure 3:
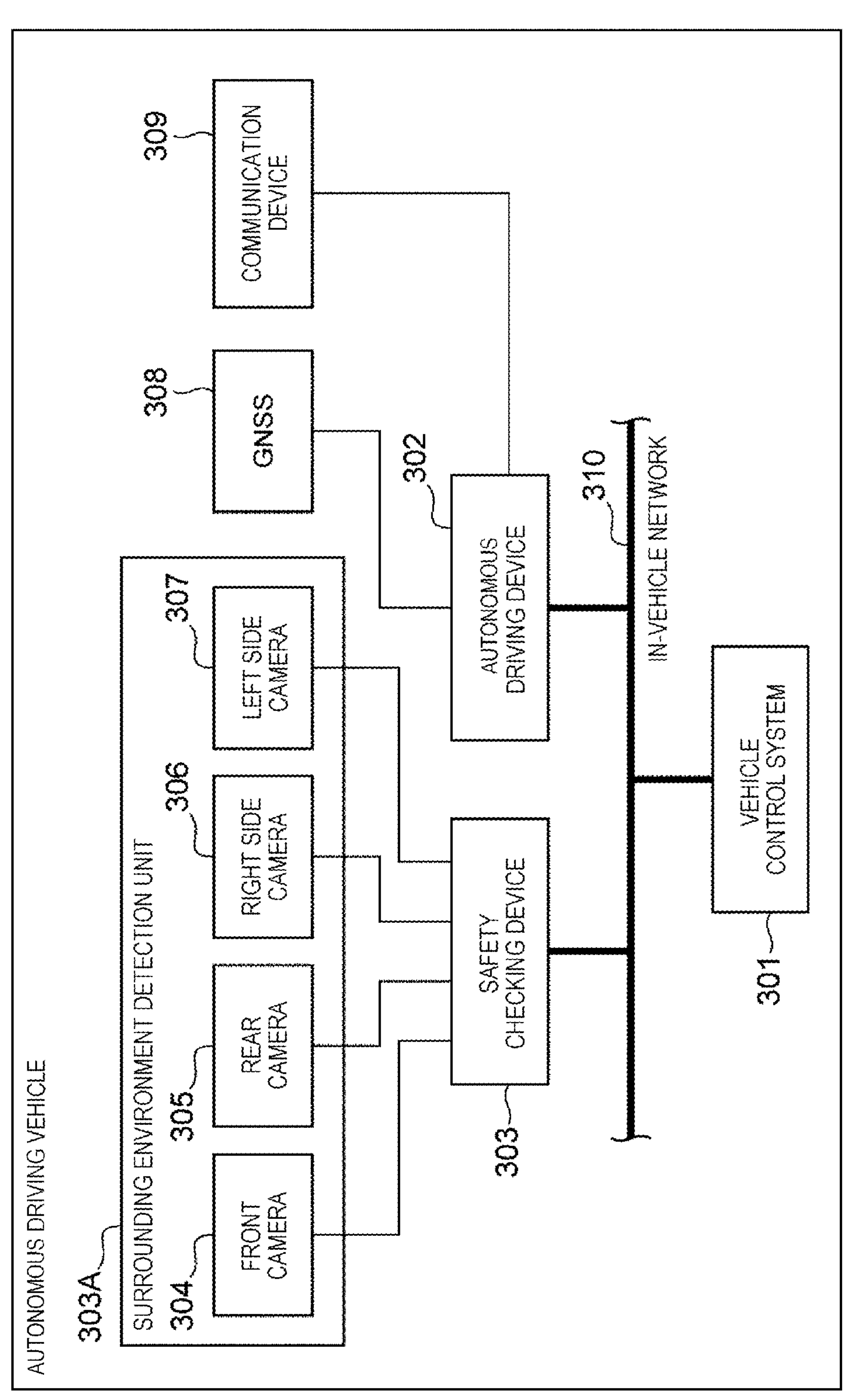
FIG. 3 is a hardware structure diagram of an autonomous driving vehicle according to the first embodiment of the invention.

FIG. 3 shows an example of a hardware structure of the autonomous driving vehicles 111 and 112. The autonomous driving vehicles 111 and 112 include a vehicle control system 301, an autonomous driving device 302, a safety checking device 303, and an in-vehicle network 310 connecting these devices.

The vehicle control system 301 controls the autonomous driving vehicle according to an acceleration instruction, a deceleration instruction, a steering instruction or the like from the autonomous driving device 302 in a control system of the autonomous driving vehicle.

The autonomous driving device 302 includes a GNSS 308 and a communication device 309. The autonomous driving device 302 acquires the position information of the own vehicle from the GNSS 308, and communicates with the control center 100 via the communication device 309. The autonomous driving device 302 calculates a travel route based on the position of the own vehicle and an instruction from the control center 100, and issues a control command to the vehicle control system 301. Accordingly, the autonomous driving device 302 can start the autonomous driving in response to the startup command from the operation terminal 170. On the other hand, the autonomous driving device 302 periodically transmits information such as the position and the vehicle speed of the own vehicle to the control center 100. The autonomous driving device 302 transmits information on a surrounding safety check situation transmitted from the safety checking device 303 to the control center 100.

The safety checking device 303 includes a front camera 304, a rear camera 305, a right side camera 306, and a left side camera 307, is connected to a surrounding environment detection unit 303A that detects information on a surrounding of the autonomous driving vehicle, monitors a situation of the surrounding of the autonomous driving vehicle, detects a person during parking, and monitors whether a safety check of the surrounding of the autonomous driving vehicle is performed. The safety checking device 303 periodically outputs a monitoring result (that is, a detection result of the surrounding environment detection unit 303A) to the autonomous driving device 302. Note that, in the present embodiment, the cameras in the four directions are described. Alternatively, the number and directions may be changed according to a size and a shape of the autonomous driving vehicle. In addition, an LIDAR or the like may be used instead of the camera or together with the camera.

The in-vehicle network 310 is a network for connecting controllers in the autonomous driving vehicle, and uses a controller area network (CAN), an in-vehicle Ethernet, or the like.

Figure 4A:
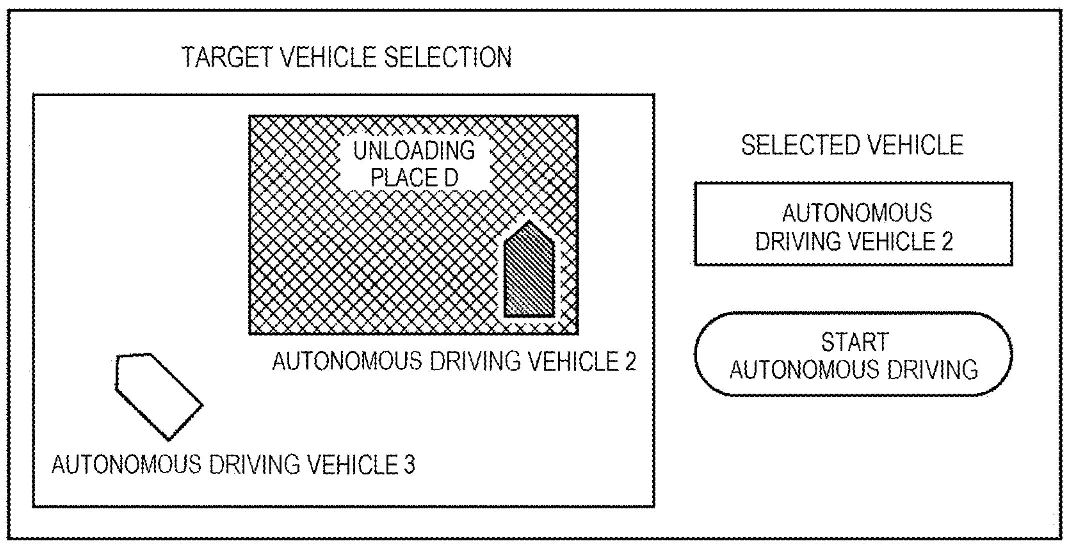
FIG. 4A is a diagram showing a screen of an operation terminal according to the first embodiment of the invention, and is an example of a startup input screen of an autonomous driving vehicle.
Figure 4B:
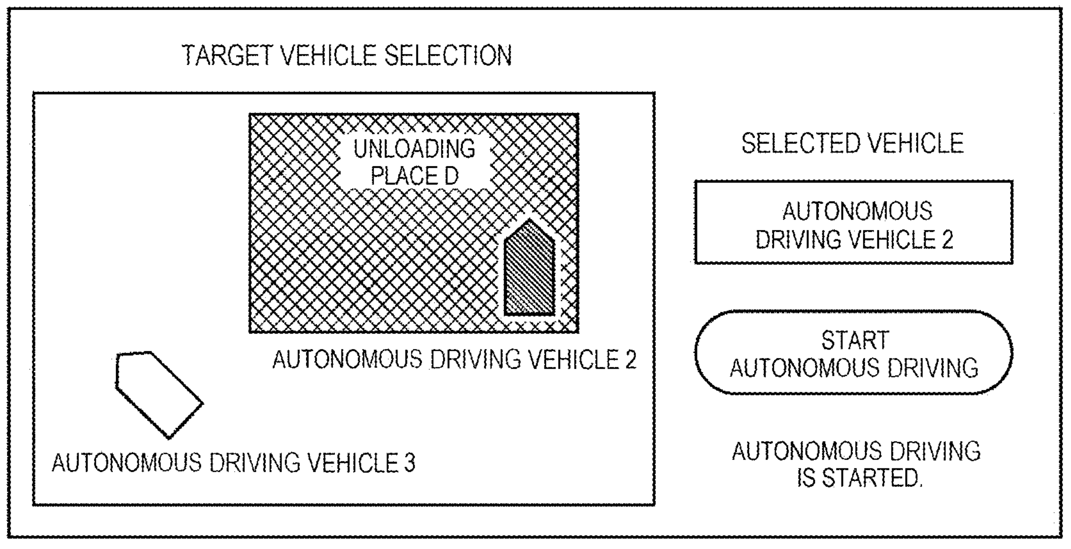
FIG. 4B is a diagram showing a screen of the operation terminal according to the first embodiment of the invention, and is an example of a screen when a startup succeeds (when an operation succeeds).
Figure 4C:
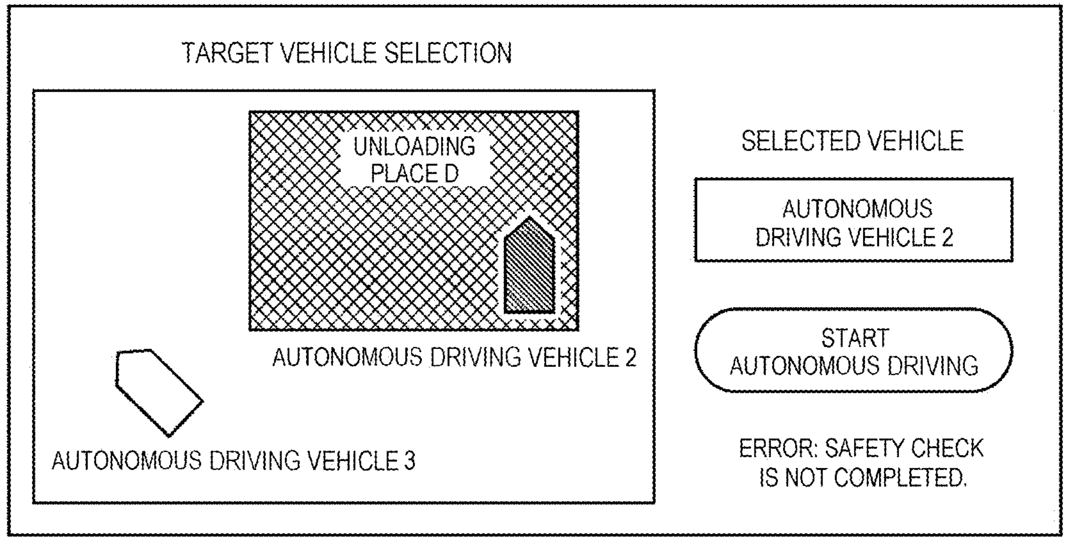
FIG. 4C is a diagram showing a screen of the operation terminal according to the first embodiment of the invention, and is an example of a screen during a startup error.

Examples of screens of the operation terminal 170 used by the on-site manager 130 are shown in FIGS. 4A, 4B, and 4C. FIG. 4A shows a screen when driving of the autonomous driving vehicle is started. FIG. 4B shows a screen in a case (when the operation succeeds) in which it is confirmed that the safety check is performed when the driving of the autonomous driving vehicle is started and the autonomous driving is started. FIG. 4C shows a screen in a case (during an error) in which the safety check is insufficient when the driving of the autonomous driving vehicle is started and the autonomous driving cannot be started.

As shown in FIG. 4A, the operation terminal 170 indicates a position and a state of a nearby autonomous driving vehicle to the on-site manager 130. Further, the operation terminal 170 includes an I/F for selecting an autonomous driving vehicle to start the autonomous driving and issuing a start instruction. FIG. 4A shows a situation in which there are an autonomous driving vehicle 3 that is in traveling and an autonomous driving vehicle 2 that is parked at an unloading place D, and shows that the on-site manager 130 is to start the autonomous driving of the autonomous driving vehicle 2.

As shown in FIG. 4B, when the autonomous driving is to be started in the state in which the safety check is performed, the operation terminal 170 displays that the autonomous driving is started.

As shows in FIG. 4C, when the autonomous driving is to be started in the state in which the safety check is insufficient, the operation terminal 170 displays an error. Even when the autonomous driving vehicle on which autonomous driving is to be started is erroneously selected, a safety check at a surrounding of the corresponding autonomous driving vehicle is not performed, and thus a similar error is displayed.

Figure 5A:
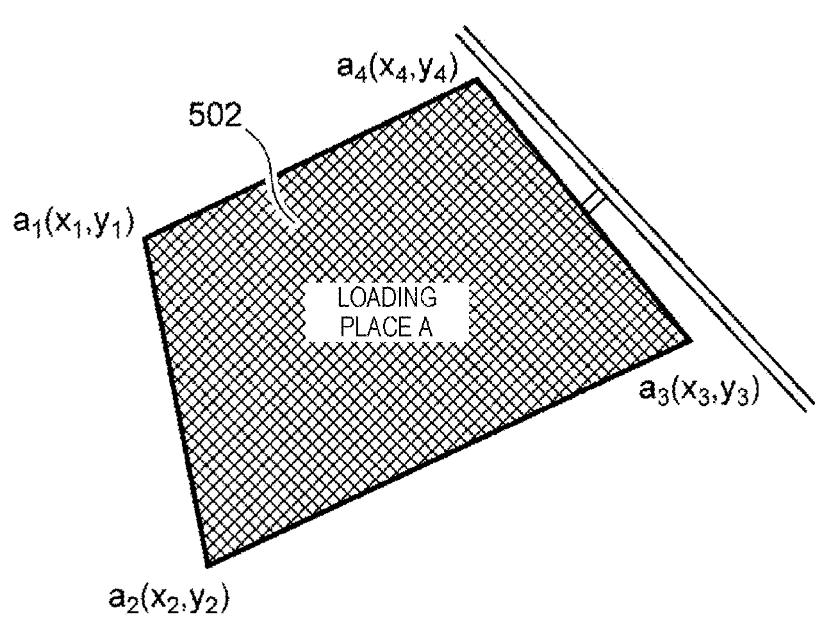
FIG. 5A is a diagram showing an internal data management table (map data table) according to the first embodiment of the invention.

FIGS. 5A, 5B, and 5C show contents of tables managed by the control center 100. FIG. 5A shows contents of the map data table 231, FIG. 5B shows contents of the vehicle state management table 232, and FIG. 5C shows contents of the on-site state management table 233.

As shown in FIG. 5A, the map data table 231 includes an area identifier 501, an area name 502, an autonomous driving start possibility 503, and coordinates 504.

The area identifier 501 is an identifier for uniquely identifying each area.

The area name 502 indicates a name of each set area. The area name 502 is used when the control center 100 shows an area on a map to the on-site manager 130.

The autonomous driving start possibility 503 indicates, when the autonomous driving vehicle is parked in each area, whether the area is a place in which the autonomous driving may be started.

The coordinates 504 indicate coordinates for indicating a range of each area. In the present embodiment, a polygon is assumed, and a latitude and a longitude of each vertex are set to the coordinates 504. Since the setting of the area is not limited to the polygon, various setting methods such as setting a circle using a center point and a radius are conceivable. For example, a loading place A is formed by a rectangle including four points, and the latitude and the longitude of each vertex are set to the coordinates 504.

As shown in FIG. 5B, the vehicle state management table 232 includes a vehicle identifier 521, a latitude 522, a longitude 523, a speed 524, a traveling direction 525, a state 526, a place 527, a safety check state 528, a state update time 529, a safety check time 530, an inspection state 531, and an inspection date and time 532.

The vehicle identifier 521 is an identifier for uniquely identifying the autonomous driving vehicle.

The latitude 522 and the longitude 523 indicate a current position of the autonomous driving vehicle.

The speed 524 and the traveling direction 525 indicate a speed at which the autonomous driving vehicle travels and a direction of the vehicle. The traveling direction 525 is indicated by, for example, an angle with respect to a reference direction (north or the like).

The state 526 indicates the state of the autonomous driving vehicle. For example, "traveling" including a temporary stop is set when the autonomous driving vehicle travels toward a destination designated by the control center 100, "parking" is set immediately after power is turned on and before an instruction from control center 100 is received, and "emergency stopping" is set when an emergency stop is performed in response to the instruction from the control center 100.

The place 527 indicates a place in which the autonomous driving vehicle is present. When the autonomous driving vehicle is in the parking area 150, the area identifier of the parking area 150 is set. None is set when the autonomous driving vehicle is in another place.

The safety check state 528 indicates whether the surrounding safety check is performed on the autonomous driving vehicle during parking. When the state 526 is "traveling", "-" is set since the autonomous driving vehicle is not a target. In other cases, "completed" is set when the surrounding safety check is performed, and "not performed" is set when the surrounding safety check is not performed. In the case of "completed", a direction in which the check is completed is also set. These settings are input and set in the control center 100 from the autonomous driving device 302 via the communication device 309 when it is detected that the safety check is performed in the safety checking device 303 of the autonomous driving vehicle 111. Further, when the autonomous driving vehicle starts to travel, the state is updated to "-", and immediately after the autonomous driving vehicle is parked, the state is updated to "not performed".

The state update time 529 indicates a time when the state 526 of the autonomous driving vehicle is updated.

The safety check time 530 is set to a time at which the safety check state 528 of the autonomous driving vehicle is updated to "completed". When the safety check state 528 is other than "completed", "-" is set.

The inspection state 531 is set to indicate whether an inspection is performed on the autonomous driving vehicle. When the inspection is performed, "completed" is set, and when the inspection is not performed, "not performed" is set.

The inspection date and time 532 is set to indicate a date and time when the inspection of the autonomous driving vehicle is performed.

The latitude 522, the longitude 523, the speed 524, the traveling direction 525, the state 526, the place 527, and the state update time 529 are updated by the vehicle information management function 221 of the vehicle information reception program 211 when information is received from the autonomous driving vehicle to the control center 100.

The safety check state 528 and the safety check time 530 are updated by the safety check state update function 222 of the vehicle information reception program 211 when information is received from the autonomous driving vehicle to the control center 100 while the autonomous driving vehicle is parked.

As shown in FIG. 5C, the on-site state management table 233 includes an area identifier 541, an area name 542, an area state 543, and a state update time 544.

The area identifier 541 is an identifier for uniquely identifying each area such as the parking area 150. Detailed coordinates and the like are managed in the map data table 231.

The area name 542 indicates each set area name. The area name 542 is used when the control center 100 shows an area on a map to the on-site manager 130.

The area state 543 indicates a state of each area managed by the control center 100. For example, "working" indicating that the on-site manager 130 performs work of loading and unloading and "no work" indicating that the on-site manager 130 does not particularly perform the work are set. In the case of "working", the startup of the autonomous driving vehicle is prevented for safety.

The state update time 544 is set to indicate a time at which the area state 543 is updated.

The area state 543 and the state update time 544 are updated by the work management function 223 of the task state reception program 212 based on a notification to the control center 100 performed from a site (specifically, the operation terminal 170 of the on-site manager 130 at the site) when the work is started and ended at the site.

Figure 6:
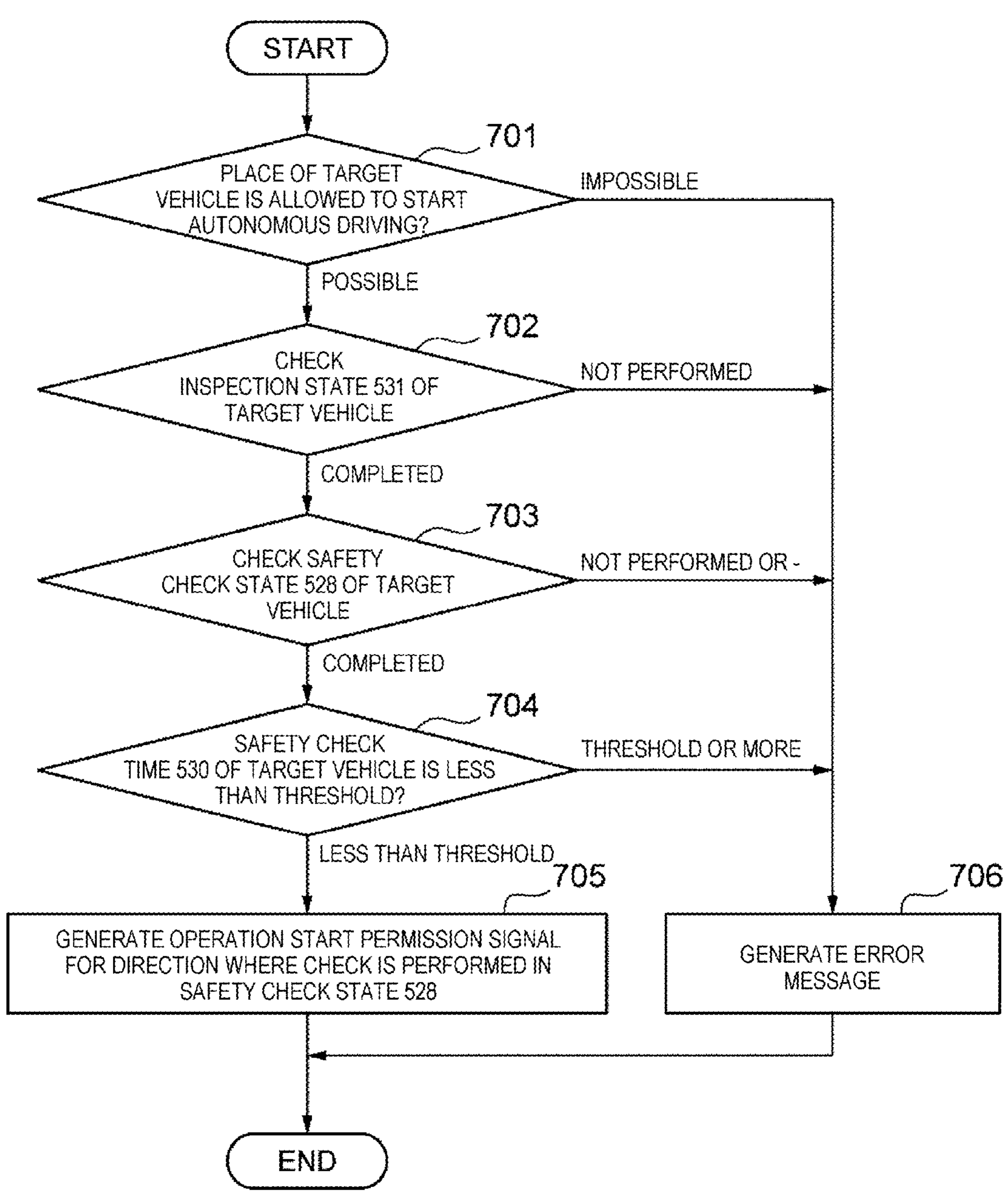
FIG. 6 is a flowchart for determining whether autonomous driving can be started according to the first embodiment of the invention.

FIG. 6 shows a flowchart of a determination of whether the autonomous driving can be started by the safety check state checking function 225 of the vehicle operation program 213. This flow is executed when the on-site manager 130 operates the operation terminal 170, the operation request of the autonomous driving vehicle (startup command to start the autonomous driving) is transmitted from the operation terminal 170, the control center 100 receives the operation request of the autonomous driving vehicle from the operation terminal 170, and the autonomous driving of the target autonomous driving vehicle for which the operation request is made is started (in other words, the autonomous driving of the autonomous driving vehicle is started according to a command from the operation terminal 170). When this flow is executed (that is, when the operation request of the autonomous driving vehicle is received from the operation terminal 170), the process proceeds to STEP 701.

In STEP 701, for the autonomous driving vehicle for which a request to start the autonomous driving is made, the current place 527 is checked based on the vehicle state management table 232, and it is checked whether the autonomous driving may be started at the place based on the autonomous driving start possibility 503 of the map data table 231. When the autonomous driving can be started, the process proceeds to STEP 702, and when the autonomous driving cannot be started, the process proceeds to STEP 706.

In STEP 702, for the autonomous driving vehicle for which a request to start the autonomous driving is made, the inspection state 531 and the inspection date and time 532 are checked based on the vehicle state management table 232. When the inspection state 531 is "completed" and the inspection date and time 532 is less than a predetermined inspection interval (for example, whether the inspection date and time 532 is the corresponding date), the process proceeds to STEP 703, and when the inspection date and time 532 is past the predetermined inspection interval or more or the inspection state 531 is "not performed", the process proceeds to STEP 706.

In STEP 703, for the autonomous driving vehicle for which a request to start the autonomous driving is made, the safety check state 528 is checked based on the vehicle state management table 232. When the safety check state 528 is "completed", the process proceeds to STEP 704, and when the safety check state 528 is "not performed" or "-", the process proceeds to STEP 706.

In STEP 704, for the autonomous driving vehicle for which a request to start the autonomous driving is made, the safety check time 530 is checked based on the vehicle state management table 232. When a time equal to or longer than a predetermined threshold elapses from the safety check time to the present (in other words, when an elapsed time from the safety check time is equal to or longer than the predetermined threshold), a timing at which the safety check is performed is late, it is necessary to check the safety again, and the process proceeds to STEP 706. When the time equal to or longer than the predetermined threshold does not elapse from the safety check time to the present (in other words, when the elapsed time from the safety check time is less than the predetermined threshold), the process proceeds to STEP 705.

In STEP 705, for the autonomous driving vehicle for which a request to start the autonomous driving is made, an operation start permission signal (permission signal for permitting the operation request of the autonomous driving vehicle only in a direction (area) in which the safety is checked) for the direction in which the check is performed in the safety check state 528 of the vehicle state management table 232 is generated, a message for notifying that the autonomous driving is started is generated on the operation terminal 170 at the same time, and the flow ends. The generated operation start permission signal is transmitted to the target autonomous driving vehicle for which the operation request is made, and the operation start permission signal including the generated message is transmitted to the operation terminal 170 that transmits the operation request (see FIG. 4B). Simultaneously with the transmission of the generated operation start permission signal to the autonomous driving vehicle, a remote control instruction of the autonomous driving vehicle received from the operation terminal 170 is transmitted from the control center 100. The autonomous driving vehicle executes (starts) the autonomous driving based on the operation start permission signal transmitted from the control center 100 and the remote control instruction (from the operation terminal 170).

In STEP 706, a situation is determined in which the operation cannot be started due to the insufficient safety check, an error message for the operation terminal 170 is generated, and this flow ends. The generated error message is transmitted to the operation terminal 170 that transmits the operation request (see FIG. 4C).

Second Embodiment

Hereinafter, a second embodiment of the invention will be described with reference to FIGS. 7 to 9.

Figure 7:
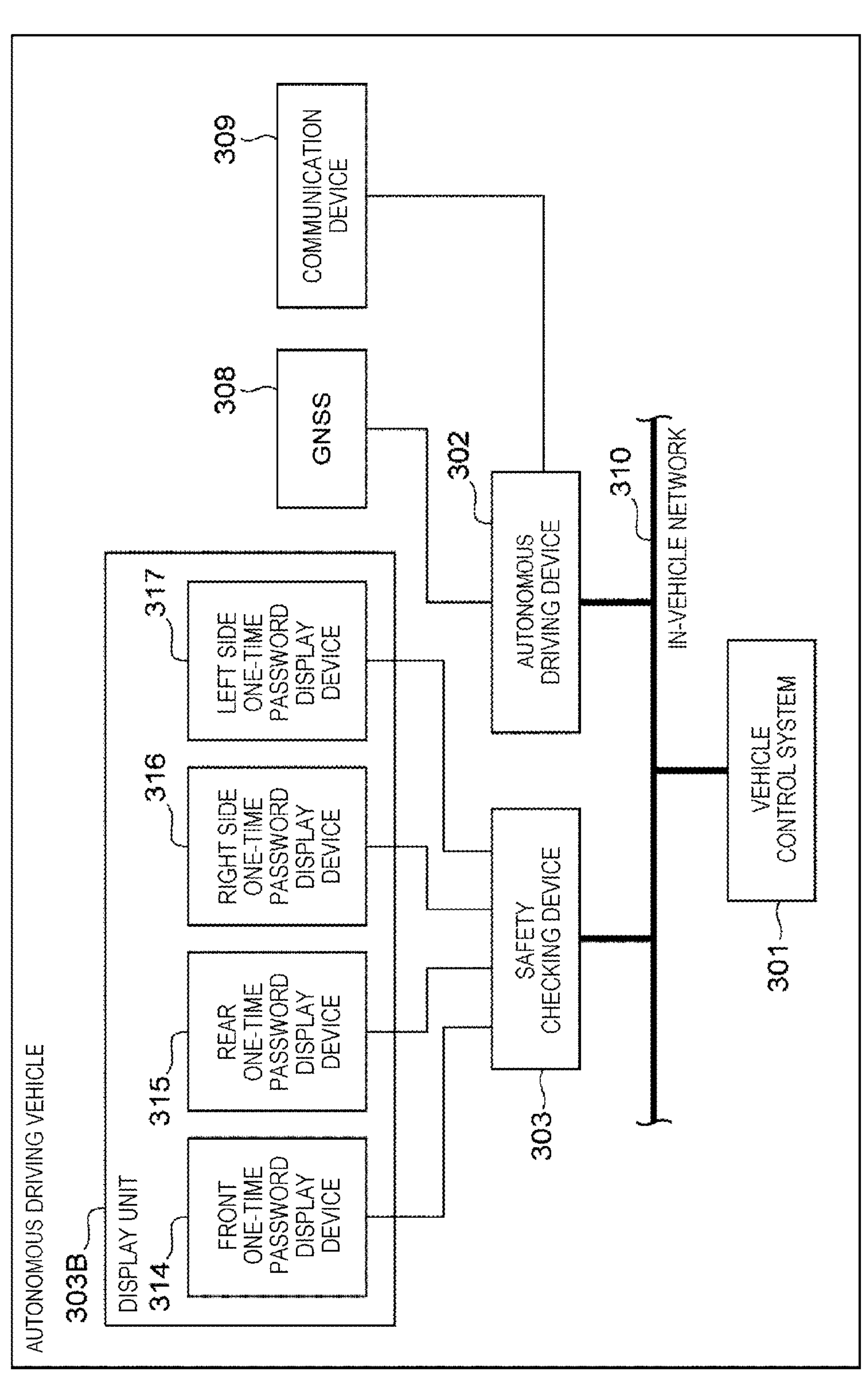
FIG. 7 is a hardware structure diagram of an autonomous driving vehicle according to a second embodiment of the invention.

FIG. 7 shows an example of a hardware structure of the autonomous driving vehicles 111 and 112 according to the second embodiment. In the second embodiment, the safety checking device 303 displays a one-time password via a front one-time password display device 314, the rear one-time password display device 315, a right side one-time password display device 316, and a left side one-time password display device 317, which are display units 303B for a surrounding (outer periphery) of the autonomous driving vehicle, instead of monitoring whether the safety check of the surrounding of the autonomous driving vehicle is performed by the camera or the like. A display content of the display unit 303B is notified to the control center 100 via the autonomous driving device 302 and the communication device 309. The one-time password is different for each display direction, and a different one is displayed for each autonomous driving vehicle.

Figure 8:
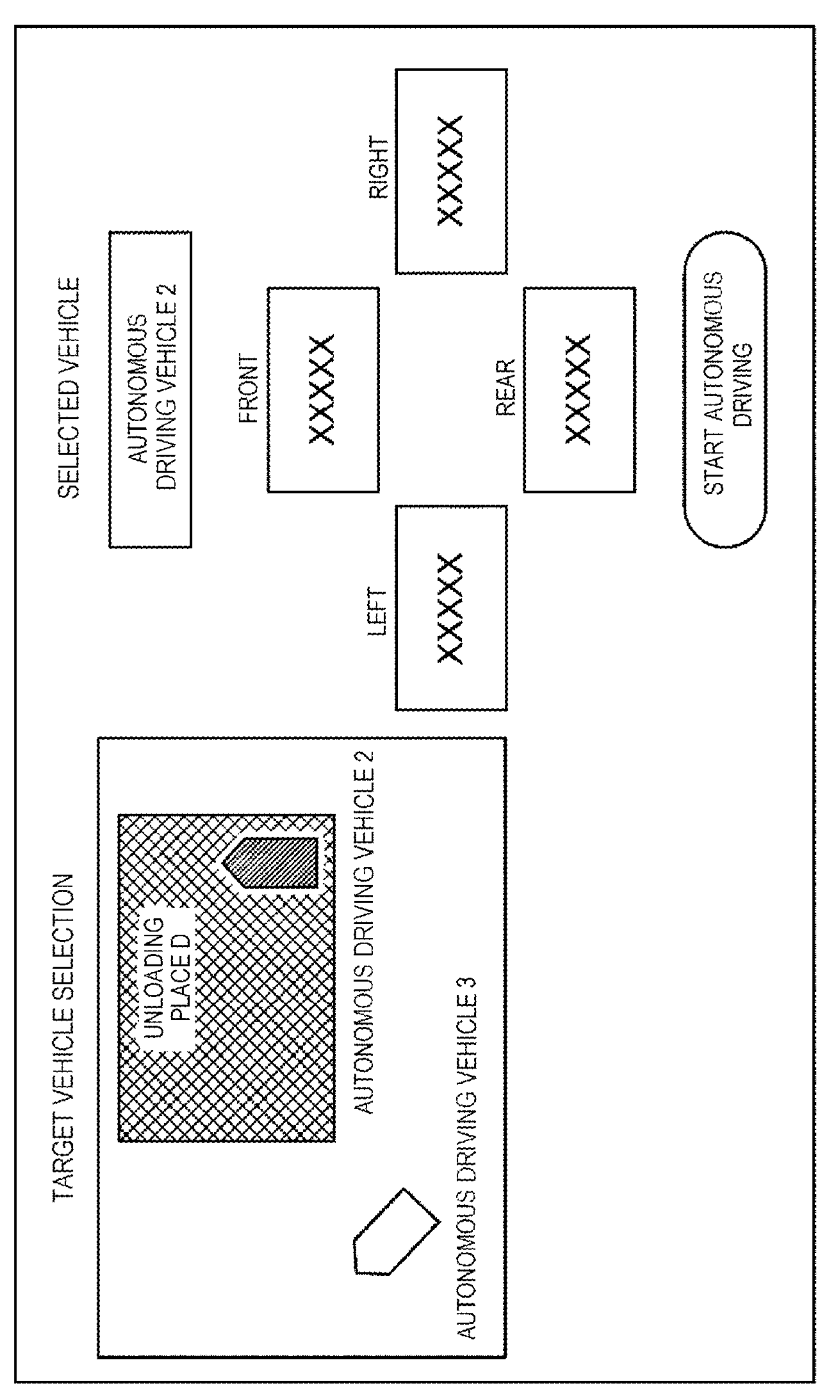
FIG. 8 shows an example of a screen of an operation terminal according to the second embodiment of the invention.

The one-time password (information displayed on the display unit 303B) is read by the operation terminal 170 of the on-site manager 130 who performs the safety check of the surrounding of the autonomous driving vehicle, and the read information is transmitted from the operation terminal 170 of the on-site manager 130 to the control center 100 (see FIG. 8).

In the present embodiment, the one-time password is displayed, and there is also a method of displaying a QR code (registered trademark) that does not overlap in a direction or an autonomous driving vehicle.

FIG. 8 shows an example of a screen used by the on-site manager 130 in the second embodiment when driving of the autonomous driving vehicle is started by the operation terminal 170.

The operation terminal 170 indicates the position and the state of the nearby autonomous driving vehicle to the on-site manager 130. Further, the operation terminal 170 includes the I/F for selecting an autonomous driving vehicle to start the autonomous driving and issuing a start instruction. Further, unlike the first embodiment, the operation terminal 170 includes an I/F for inputting the one-time password displayed in each direction of the autonomous driving vehicle.

Figure 9:
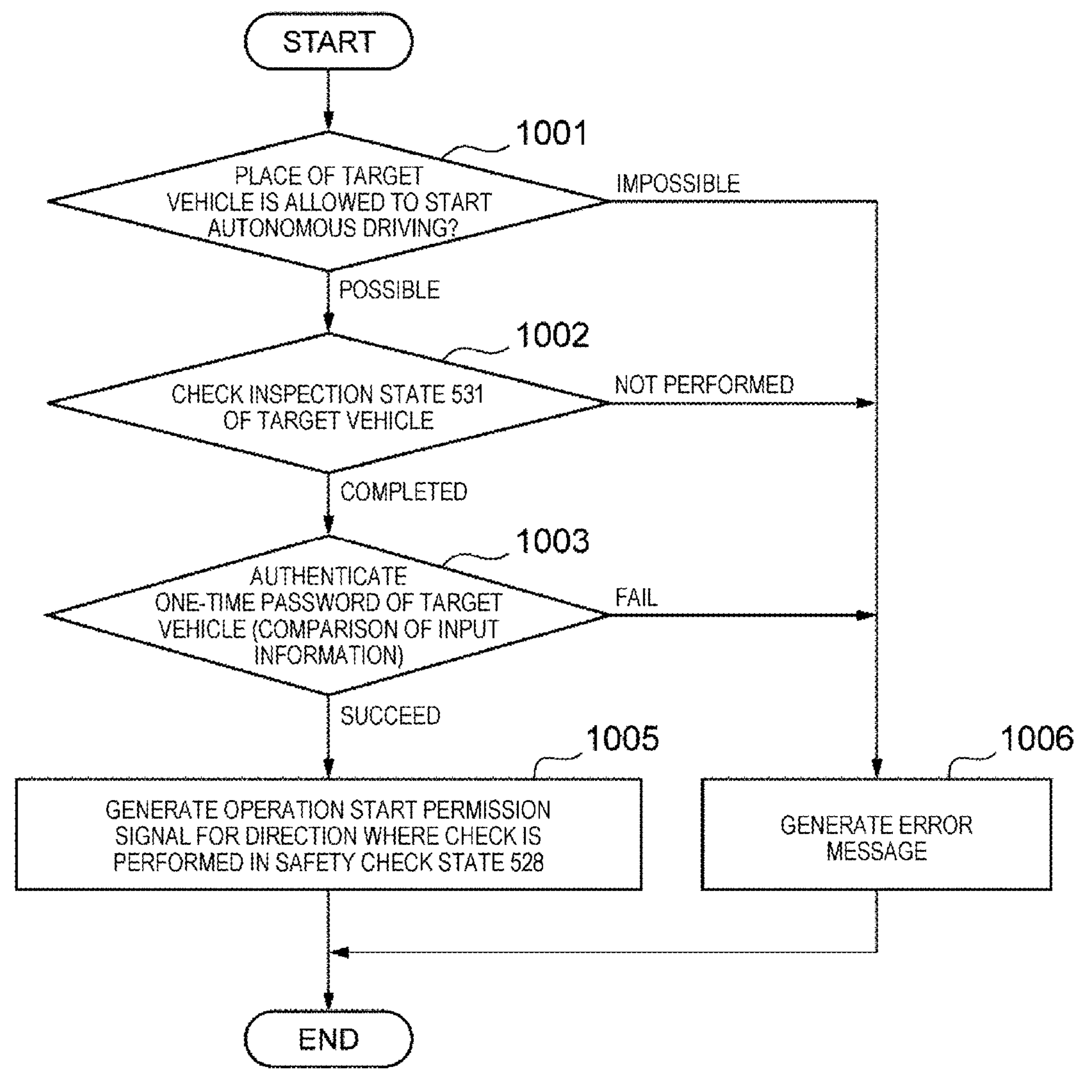
FIG. 9 is a flowchart for determining whether the autonomous driving can be started according to the second embodiment of the invention.

FIG. 9 shows a flowchart of a determination of whether the autonomous driving can be started by the safety check state checking function 225 of the vehicle operation program 213 according to the second embodiment. This flow is executed when the on-site manager 130 operates the operation terminal 170, the operation request (startup command to start the autonomous driving) of the autonomous driving vehicle is transmitted from the operation terminal 170, the control center 100 receives the operation request of the autonomous driving vehicle from the operation terminal 170, and the autonomous driving of the target autonomous driving vehicle for which the operation request is made is started (in other words, the autonomous driving of the autonomous driving vehicle is started according to a command from the operation terminal 170). When this flow is executed (that is, when the operation request of the autonomous driving vehicle is received from the operation terminal 170), the process proceeds to STEP 1001.

In STEP 1001, for the autonomous driving vehicle for which a request to start the autonomous driving is made, the current place 527 is checked based on the vehicle state management table 232, and it is checked whether the autonomous driving may be started at the place based on the autonomous driving start possibility 503 of the map data table 231. When the autonomous driving can be started, the process proceeds to STEP 1002, and when the autonomous driving cannot be started, the process proceeds to STEP 1006.

In STEP 1002, for the autonomous driving vehicle for which a request to start the autonomous driving is made, the inspection state 531 and the inspection date and time 532 are checked based on the vehicle state management table 232. When the inspection state 531 is "completed" and the inspection date and time 532 is less than a predetermined inspection interval (for example, whether the inspection date and time 532 is the corresponding date), the process proceeds to STEP 1003, and when the inspection date and time 532 is past the predetermined inspection interval or more or the inspection state 531 is "not performed", the process proceeds to STEP 1006.

In STEP 1003, for the autonomous driving vehicle for which a request to start the autonomous driving is made, information (in other words, information read by the operation terminal 170) received from the operation terminal 170 is compared with received information such as authentication transmitted from the autonomous driving vehicle. For example, it is authenticated whether the one-time password received from the operation terminal 170 matches the one-time password transmitted from the autonomous driving vehicle. When the comparison of the received information succeeds, the process proceeds to STEP 1005, and when the comparison of the received information fails, the process proceeds to STEP 1006.

In STEP 1005, for the autonomous driving vehicle for which a request to start the autonomous driving is made, an operation start permission signal (permission signal for permitting the operation request of the autonomous driving vehicle only in a direction (area) in which safety is checked) for the direction in which the authentication of the one-time password succeeds is generated, the message for notifying that the autonomous driving is started is generated on the operation terminal 170 at the same time, and the flow ends. The generated operation start permission signal is transmitted to the target autonomous driving vehicle for which the operation request is made, and the operation start permission signal including the generated message is transmitted to the operation terminal 170 that transmits the operation request. Simultaneously with the transmission of the generated operation start permission signal to the autonomous driving vehicle, the remote control instruction of the autonomous driving vehicle received from the operation terminal 170 is transmitted from the control center 100. The autonomous driving vehicle executes (starts) the autonomous driving based on the operation start permission signal transmitted from the control center 100 and the remote control instruction (from the operation terminal 170).

In STEP 1006, a situation is determined in which the operation cannot be started due to the insufficient safety check, an error message for the operation terminal 170 is generated, and this flow ends. The generated error message is transmitted to the operation terminal 170 that transmits the operation request.

Third Embodiment

Next, a third embodiment of the invention will be described with reference to FIGS. 10A and 10B.

In the third embodiment, a case will be described in which the on-site manager 130 performs the remote control on the autonomous driving vehicle using the operation terminal 170. When the remote control of the autonomous driving vehicle is performed, the on-site manager 130 requests the control center 100 to perform the remote control on the autonomous driving vehicle using the operation terminal 170. In the control center 100, when a request of the remote control for the autonomous driving vehicle is received from operation terminal 170, it is determined whether to start the remote control (whether to permit the request of the remote control) based on an execution situation of the safety check of the surrounding of the target autonomous driving vehicle, and when it is determined that the start of the remote control is permitted, the autonomous driving vehicle is notified that the remote control is started (remote control start permission signal), and the operation terminal 170 is notified that the remote control can be performed (remote control start permission signal). Accordingly, the on-site manager 130 starts the remote control on the operation terminal 170. In this case, when the on-site manager 130 operates the operation terminal 170, the operation terminal 170 issues a remote control instruction to the autonomous driving vehicle based on the remote control start permission signal, and the target autonomous driving vehicle executes (starts) the autonomous driving based on the remote control start permission signal transmitted from the control center 100 and the remote control instruction transmitted from the operation terminal 170. A safety check method in the control center 100 is the same as that in the first embodiment or the second embodiment, and a screen content of the operation terminal 170 is different such that the remote control of the autonomous driving vehicle can be performed.

Figure 10A:
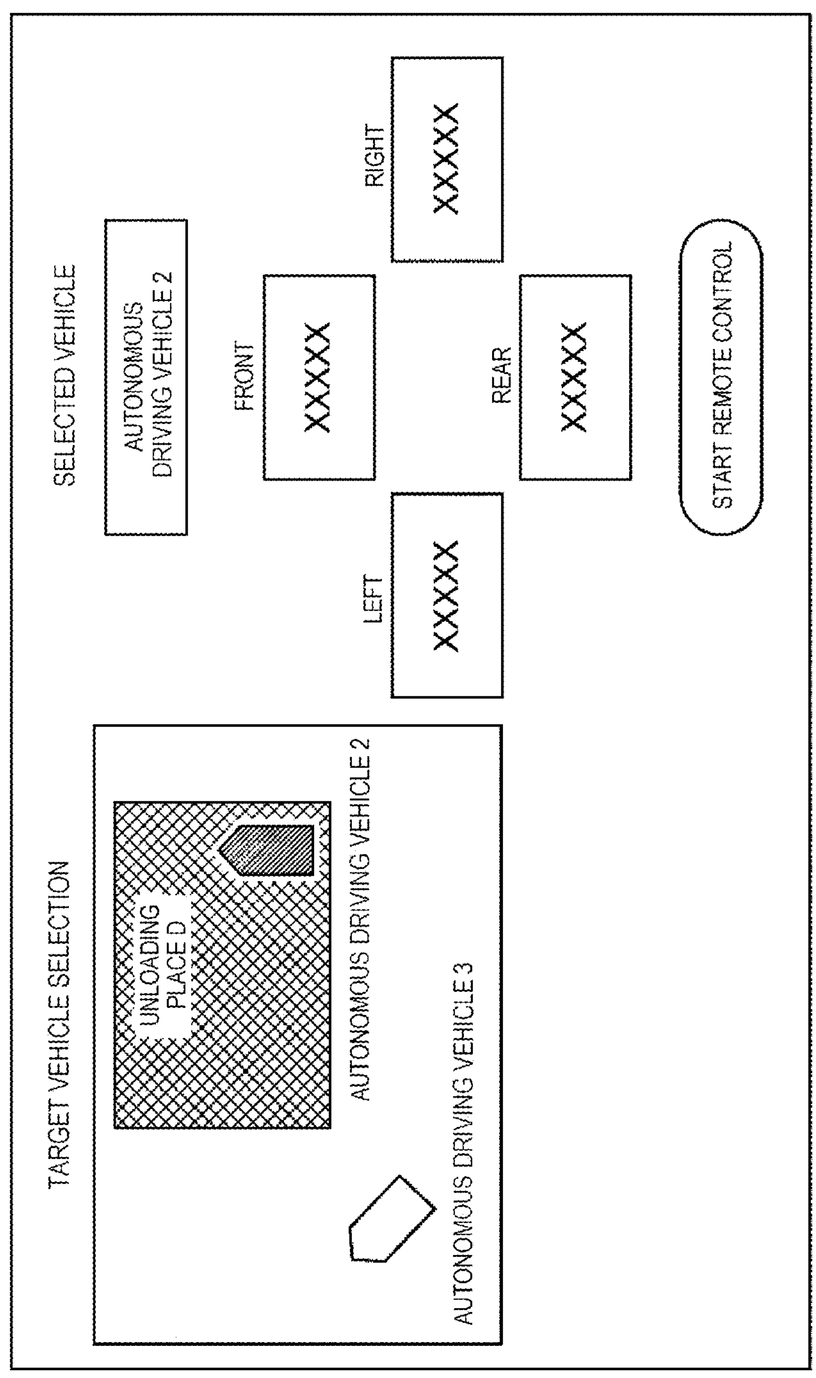
FIG. 10A is a diagram showing a screen of an operation terminal according to a third embodiment of the invention, and is an example of a screen when remote control of an autonomous driving vehicle is started.
Figure 10B:
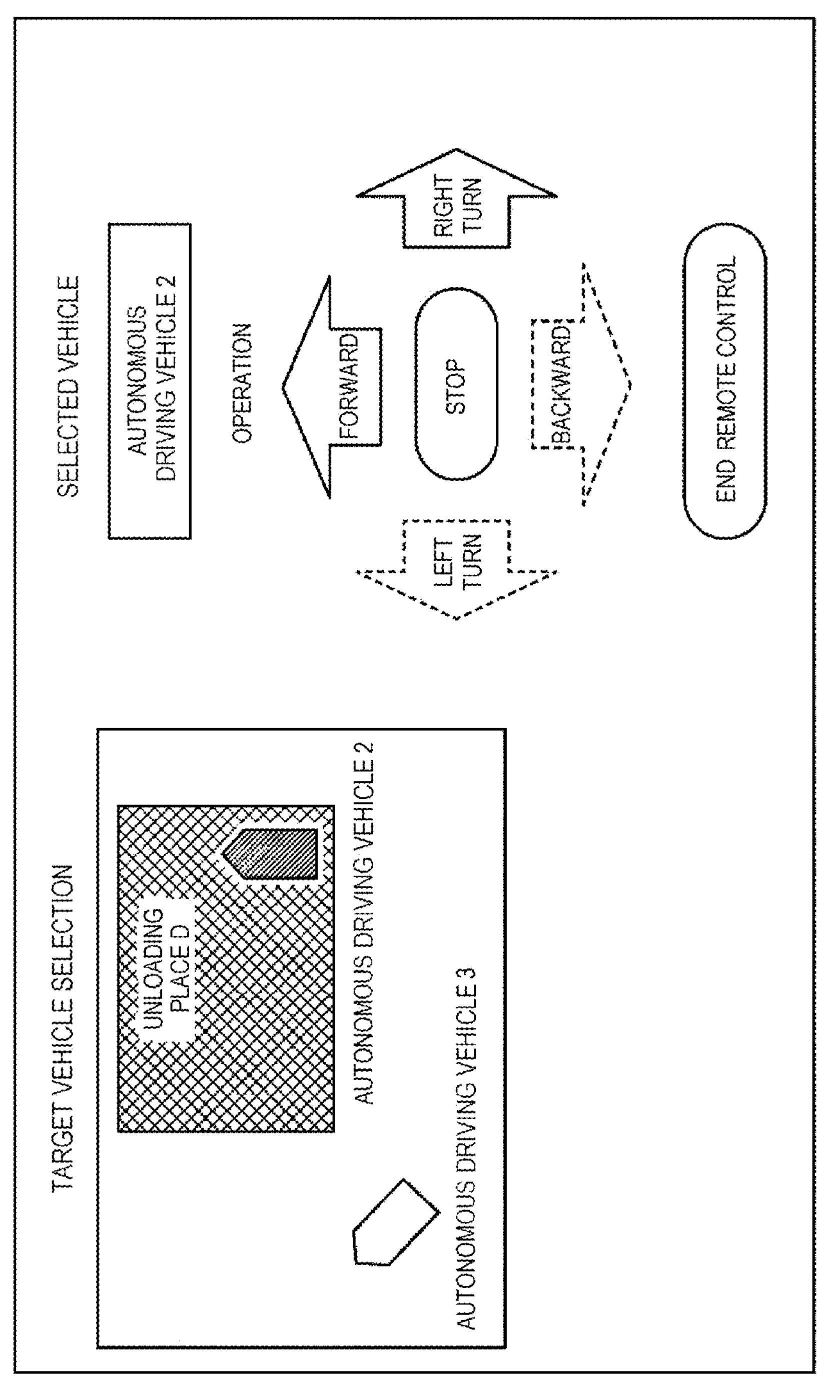
FIG. 10B is a diagram showing the screen of the operation terminal according to the third embodiment of the invention, and is an example of a screen during the remote control of the autonomous driving vehicle.

FIGS. 10A and 10B show an example of a screen when the remote control of the autonomous driving vehicle is started and an example of a screen during the remote control of the autonomous driving vehicle on the operation terminal 170 used by the on-site manager 130 in the third embodiment. FIG. 10A shows a screen when the remote control is started, and FIG. 10B shows a screen during the remote control after the remote control is permitted.

As shown in FIG. 10A, the operation terminal 170 indicates the position and the state of a nearby autonomous driving vehicle to the on-site manager 130. Further, the operation terminal 170 includes the I/F for selecting an autonomous driving vehicle to start the remote control and issuing the start instruction. In the present embodiment, similarly to the second embodiment, an example of a screen is shown in a case in which the safety check of the surrounding of the autonomous driving vehicle is performed using the one-time password.

As shown in FIG. 10B, when the remote control is started in a state in which the safety check is performed, the operation terminal 170 displays an operation button for the remote control. The operation button can be used only in the direction in which the safety check is performed. Accordingly, the remote control can be performed only in the direction in which the safety check is performed. The example in FIG. 10B shows a state in which the one-time passwords of the front side and the right side are correctly input, remote control of a forward movement and a right turn can be performed, and remote control of a backward movement and a left turn cannot be performed.

Summary of First to Third Embodiments

As described above, the control system according to the present embodiment is a control system including an autonomous driving vehicle, a management device (control center 100) configured to manage the autonomous driving vehicle, and an operation terminal 170 configured to remotely operate the autonomous driving vehicle, in which the autonomous driving vehicle includes a safety checking unit (safety checking device 303) configured to check safety of a surrounding of the autonomous driving vehicle, and an autonomous driving unit (autonomous driving device 302) configured to start autonomous driving in response to a command from the operation terminal 170, the management device (control center 100) includes an autonomous driving vehicle management unit (211, 213) configured to manage the autonomous driving vehicle, when an operation request (of starting autonomous driving) of the autonomous driving vehicle is received from the operation terminal 170, the autonomous driving vehicle management unit (211, 213) transmits a permission signal for permitting the operation request to the operation terminal 170 and the autonomous driving vehicle based on a check result (STEP 703, 704) of the safety checking unit (safety checking device 303), and the autonomous driving vehicle executes the autonomous driving based on the permission signal and an operation instruction from the operation terminal.

When the operation request of the autonomous driving vehicle is received from the operation terminal 170, the autonomous driving vehicle management unit (211, 213) transmits the permission signal for permitting the operation request to the operation terminal 170 and the autonomous driving vehicle based on the check result (STEP 703, 704) of the safety checking unit (safety checking device 303), and transmits the operation instruction received from the operation terminal 170 to the autonomous driving vehicle, and the autonomous driving vehicle executes the autonomous driving based on the permission signal transmitted from the autonomous driving vehicle management unit (211, 213) and the operation instruction.

When the operation request of the autonomous driving vehicle is received from the operation terminal 170, the autonomous driving vehicle management unit (211, 213) transmits the permission signal for permitting the operation request to the operation terminal 170 and the autonomous driving vehicle based on the check result (STEP 703, 704) of the safety checking unit (safety checking device 303), the operation terminal 170 issues the operation instruction to the autonomous driving vehicle based on the permission signal, and the autonomous driving vehicle executes the autonomous driving based on the permission signal transmitted from the autonomous driving vehicle management unit (211, 213) and the operation instruction transmitted from the operation terminal 170.

The permission signal permits the operation request (of starting autonomous driving) only in an area (direction) in which safety is checked by the safety checking unit (safety checking device 303) (at the surrounding of the autonomous driving vehicle).

The permission signal permits the operation request (of starting autonomous driving) only when an elapsed time from a safety check time of the safety checking unit (safety checking device 303) is less than a predetermined threshold.

The permission signal permits the operation request (of starting autonomous driving) only when an inspection of the autonomous driving vehicle is performed (when the safety of the autonomous driving vehicle is checked) and an inspection date and time of the autonomous driving vehicle is less than a predetermined inspection interval.

The safety checking unit (safety checking device 303) includes a surrounding environment detection unit 303A configured to detect information on the surrounding of the autonomous driving vehicle, and in a safety checking process of the safety checking unit (safety checking device 303), a detection result of the surrounding environment detection unit 303A is transmitted to the management device (control center 100).

The safety checking unit (safety checking device 303) includes a display unit 303B configured to display a predetermined display (QR code (registered trademark), one-time password) on an outer periphery of the autonomous driving vehicle, and in the safety checking process of the safety checking unit (safety checking device 303), information displayed on the display unit 303B is read by the operation terminal 170, the information is transmitted from the operation terminal 170 to the management device (control center 100), and the information from the operation terminal 170 and information of the management device (control center 100) are compared.

That is, the control system according to the present embodiment grasps whether the safety check is performed using an in-vehicle camera that monitors the surrounding of the vehicle, the QR code (registered trademark) set at the surrounding of the vehicle, or the one-time password, and does not startup an erroneous vehicle by using a check result in response to an instruction to start the autonomous driving by an on-site manager. Further, a range in which the autonomous driving or the remote control operation is permitted is set according to a range in which the check is performed.

According to the present embodiment, whether the safety check of the surrounding of the autonomous driving vehicle is performed is detected by the autonomous driving vehicle or information on the surrounding of the autonomous driving vehicle is input, thereby confirming that the safety check is performed and ensuring safety. Accordingly, the safety check of the surrounding of the autonomous driving vehicle is reliably performed, and it is possible to reduce a risk of collision during startup due to a check omission.

The invention is not limited to the above-described embodiments, and includes various modifications. For example, the above embodiments have been described in detail to facilitate understanding of the invention, and the invention is not necessarily limited to those including all the configurations described above.

A part or all of the configurations, functions, processing units, processing methods, and the like described above may be implemented by hardware by, for example, designing with an integrated circuit. The above configurations, functions, and the like may be implemented by software by a processor interpreting and executing a program for implementing each function. Information such as a program, a table, and a file for implementing each function can be stored in a recording device such as a memory, a hard disk, and a solid state drive (SSD), or in a recording medium such as an IC card, an SD card, and a DVD.

Control lines and information lines indicate what is considered to be necessary for description, and not necessarily all control lines and information lines are always shown on a product. Actually, almost all configurations may be considered to be connected to one another.

REFERENCE SIGNS LIST

100: control center (management device)
111, 112: autonomous driving vehicle
120: manager
130: on-site manager
140: manned vehicle
150: parking area
160: road
170: operation terminal
211: vehicle information reception program (autonomous driving vehicle management unit)
212: task state reception program
213: vehicle operation program (autonomous driving vehicle management unit)
221: vehicle information management function
222: safety check state update function
223: work management function
224: autonomous driving start operation reception function
225: safety check state checking function
226: autonomous driving start instruction function
231: map data (map data table)
232: vehicle state management table
233: on-site state management table
301: vehicle control system
302: autonomous driving device (autonomous driving unit)
303: safety checking device (safety checking unit)
303A: surrounding environment detection unit
303B: display unit
310: in-vehicle network

The invention claimed is:

1. A control system comprising:
an autonomous driving vehicle;
a management device configured to manage the autonomous driving vehicle; and
an operation terminal configured to remotely operate the autonomous driving vehicle, wherein
the autonomous driving vehicle includes a safety checking unit configured to check safety of a surrounding of the autonomous driving vehicle, and an autonomous driving unit configured to start autonomous driving in response to a command from the operation terminal,
the management device includes an autonomous driving vehicle management unit configured to manage the autonomous driving vehicle,
when an operation request of the autonomous driving vehicle is received from the operation terminal, the autonomous driving vehicle management unit transmits a permission signal for permitting the operation request to the operation terminal and the autonomous driving vehicle based on a check result of the safety checking unit, and
the autonomous driving vehicle executes the autonomous driving based on the permission signal and an operation instruction from the operation terminal; wherein
the permission signal permits the operation request only when an inspection of the autonomous driving vehicle is performed and an inspection date and time of the autonomous driving vehicle is less than a predetermined inspection interval.

2. The control system according to claim 1, wherein
when the operation request of the autonomous driving vehicle is received from the operation terminal, the autonomous driving vehicle management unit transmits the permission signal for permitting the operation request to the operation terminal and the autonomous driving vehicle based on the check result of the safety checking unit, and transmits the operation instruction received from the operation terminal to the autonomous driving vehicle, and
the autonomous driving vehicle executes the autonomous driving based on the permission signal transmitted from the autonomous driving vehicle management unit and the operation instruction.

3. The control system according to claim 1, wherein
when the operation request of the autonomous driving vehicle is received from the operation terminal, the autonomous driving vehicle management unit transmits the permission signal for permitting the operation request to the operation terminal and the autonomous driving vehicle based on the check result of the safety checking unit, the operation terminal issues the operation instruction to the autonomous driving vehicle based on the permission signal, and the autonomous driving vehicle executes the autonomous driving based on the permission signal transmitted from the autonomous driving vehicle management unit and the operation instruction transmitted from the operation terminal.

4. The control system according to claim 1, wherein the permission signal permits the operation request only in an area in which safety is checked by the safety checking unit.

5. The control system according to claim 1, wherein the permission signal permits the operation request only when an elapsed time from a safety check time of the safety checking unit is less than a predetermined threshold.

6. The control system according to claim 1, wherein the safety checking unit includes a surrounding environment detection unit configured to detect information on the surrounding of the autonomous driving vehicle, and in a safety checking process of the safety checking unit, a detection result of the surrounding environment detection unit is transmitted to the management device.

7. The control system according to claim 1, wherein the safety checking unit includes a display unit configured to display a predetermined display on an outer periphery of the autonomous driving vehicle, and in the safety checking process of the safety checking unit, information displayed on the display unit is read by the operation terminal, the information is transmitted from the operation terminal to the management device, and the information from the operation terminal and information of the management device are compared.

8. A management method for managing an autonomous driving vehicle that starts autonomous driving in response to a command from an operation terminal that remotely operates the autonomous driving vehicle, the management method comprising:

a safety checking step of checking safety of a surrounding of the autonomous driving vehicle;

a transmission step of transmitting, when an operation request of the autonomous driving vehicle is received from the operation terminal, a permission signal for permitting the operation request to the operation terminal and the autonomous driving vehicle based on a check result of the safety checking step; and an autonomous driving execution step of executing the autonomous driving of the autonomous driving vehicle based on the permission signal and an operation instruction from the operation terminal; wherein the permission signal permits the operation request only when an inspection of the autonomous driving vehicle is performed and an inspection date and time of the autonomous driving vehicle is less than a predetermined inspection interval.

9. A non-transitory management program implemented on a processor with associated memory for managing an autonomous driving vehicle that starts autonomous driving in response to a command from an operation terminal that remotely operates the autonomous driving vehicle, wherein when an operation request of the autonomous driving vehicle is received from the operation terminal, the management program causes a computer to execute a procedure of transmitting a permission signal for permitting the operation request to the operation terminal and the autonomous driving vehicle based on a check result of checking safety of a surrounding of the autonomous driving vehicle; wherein the permission signal permits the operation request only when an inspection of the autonomous driving vehicle is performed and an inspection date and time of the autonomous driving vehicle is less than a predetermined inspection interval.

* * * * *